United States Patent
Hanada

(10) Patent No.: US 8,221,568 B2
(45) Date of Patent: Jul. 17, 2012

(54) PNEUMATIC TIRE FOR PASSENGER CARS AND METHOD OF MANUFACTURING THE SAME

(75) Inventor: Ryoji Hanada, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 1206 days.

(21) Appl. No.: 11/500,934

(22) Filed: Aug. 9, 2006

(65) Prior Publication Data

US 2006/0267249 A1  Nov. 30, 2006

Related U.S. Application Data

(62) Division of application No. 10/615,239, filed on Jul. 9, 2003, now abandoned.

(30) Foreign Application Priority Data

Jul. 17, 2002 (JP) .................................. 2002-208449
Jul. 17, 2002 (JP) .................................. 2002-208469

(51) Int. Cl.
*B29D 30/00* (2006.01)
*B29D 30/08* (2006.01)
*B29C 70/00* (2006.01)

(52) U.S. Cl. .................... 156/110.1; 156/123; 264/326; 264/501

(58) Field of Classification Search .............. 156/110.1, 156/123; 264/326, 501
See application file for complete search history.

(56) References Cited

U.S. PATENT DOCUMENTS

| 4,253,513 A | * | 3/1981 | Larson et al. | ................. 152/452 |
| 4,525,430 A | * | 6/1985 | Bourgois | ...................... 428/625 |
| 2004/0011450 A1 | | 1/2004 | Hanada | |

FOREIGN PATENT DOCUMENTS

| EP | 604984 | * | 9/1994 |
| JP | 56-086805 A1 | | 7/1981 |
| JP | 63051130 | | 3/1988 |
| JP | 7-290458 | * | 11/1995 |
| JP | 2002-103472 | * | 4/2002 |

OTHER PUBLICATIONS

Machine translation of JP 7-290458, 1995.*

* cited by examiner

*Primary Examiner* — Justin Fischer
(74) *Attorney, Agent, or Firm* — Greer, Burns & Crain, Ltd.

(57) ABSTRACT

A pneumatic tire for passenger cars has a tread and left and right beads, the beads each having a bead core embedded therein with a bead filler disposed on the outer circumferential side of the bead core, at least one carcass ply being arranged to extend between the beads, the carcass ply having reinforcing cords which extend in a width direction of the tire and are aligned at a predetermined interval along a circumferential direction of the tire, and two belt plies being disposed on the outer circumferential side of the carcass ply in the tread. An average of residual strain of the reinforcing cords of an innermost carcass ply is set to −10% to 5% in each side region located between an outer circumferential end of the bead filler and an end of an overlapping portion of the two belt plies.

5 Claims, 3 Drawing Sheets

PNEUMATIC TIRE FOR PASSENGER CARS AND METHOD OF MANUFACTURING THE SAME

This is a divisional of application Ser. No. 10/615,239, filed Jul. 9, 2003, now abandoned the entire contents of which are hereby incorporated by reference.

The present application claims priority based on Japanese Patent Application No. 2002-208449, filed Jul. 17, 2002 and Japanese Patent Application No. 2002-208469, filed Jul. 17, 2002, the entirety of which is being incorporated herein by reference.

BACKGROUND OF THE INVENTION

The present invention relates to pneumatic tires for passenger cars and methods of manufacturing the same. More specifically, the present invention relates to a pneumatic tire for passenger cars and a method for manufacturing thereof, in which braking performance can be improved.

Tire performance of pneumatic tires for passenger cars is typically improved by changing materials and structures thereof. Conventionally, in order to advance braking performance of the tires, there has been proposed a technique to use high-grip rubber compounds in the tire tread. The use of such rubber compounds, however, deteriorates rolling resistance and further causes degradation of wear characteristics.

Another technique of improving braking performance is that a new reinforcing ply is disposed to enhance rigidity of the tire. The placement of such a new component, however, incurs increases in cost and weight.

SUMMARY OF THE INVENTION

It is an object of the present invention to provide a pneumatic tire for passenger cars and a method of manufacturing the same, in which braking performance can be improved without using high-grip rubber compounds in a tread and without placing any new component.

In order to achieve the above object, the present invention provides a pneumatic tire for passenger cars having a tread and left and right beads, the beads each having a bead core embedded therein with a bead filler disposed on the outer circumferential side of the bead core, at least one carcass ply being arranged to extend between the beads, the carcass ply having reinforcing cords which extend in a width direction of the tire and are aligned at a predetermined interval along a circumferential direction of the tire, and two belt plies being disposed on the outer circumferential side of the carcass ply in the tread, wherein an average of residual strain of the reinforcing cords of an innermost carcass ply is set to −10% to 5% in each of side regions located between an outer circumferential end of the bead filler and an end of an overlapping portion of the two belt plies.

The present invention provides another pneumatic tire for passenger cars having a tread and left and right beads, the beads each having a bead core embedded therein with a bead filler disposed on the outer circumferential side of the bead core, at least one carcass ply being arranged to extend between the beads, the carcass ply having reinforcing cords which extend in a width direction of the tire and are aligned at a predetermined interval along a circumferential direction of the tire, and two belt plies being disposed on the outer circumferential side of the carcass ply in the tread,wherein an average of residual strain of the reinforcing cords of an innermost carcass ply is set to −5% to 1% in a overlapping region corresponding to an overlapping portion of the two belt plies.

The present invention also provides a method of manufacturing a pneumatic tire for passenger cars comprising the steps of setting a green tire in a shaping mold for pre-shaping green tires, the green tire having a tread and left and right beads, the beads each having a bead core embedded therein with an unvulcanized bead filler disposed on the outer circumferential side of the bead core, at least one unvulcanized carcass ply being arranged to extend between the beads, the carcass ply having reinforcing cords which extend in a width direction of the tire and are aligned at a predetermined interval along a circumferential direction of the tire, and two unvulcanized belt plies being disposed on the outer circumferential side of the unvulcanized carcass ply in the tread, the shaping mold having shaping surfaces which can shape a green tire having a size close to that of the green tire which is being pressed against molding surfaces of a vulcanization mold; inflating the set green tire so that the set green tire is pressed against the shaping surfaces of the shaping mold to form a shaped green tire; setting the shaped green tire in the vulcanization mold; and curing the shaped green tire after inflating the shaped green tire so as to press against the molding surfaces of the vulcanization mold.

According to the present invention described above, by specifying the average of residual strain of the reinforcing cords of the carcass ply, as described above, braking performance can be improved due to rigidity of the carcass ply greater than that of the conventional carcass ply. Since it is not required to change a high-grip rubber compound in the tread or provide any new components problems do not arise such as degradation of rolling resistance and wear characteristics, and increases in cost and weight.

BRIEF DESCRIPION OF THE DRAWINGS

DETAILED DESCRIPTION OF THE PREFERRED EMBODIMENT

The embodiments of the present invention will be described in detail below with reference to the attached drawings.

Figure 1:
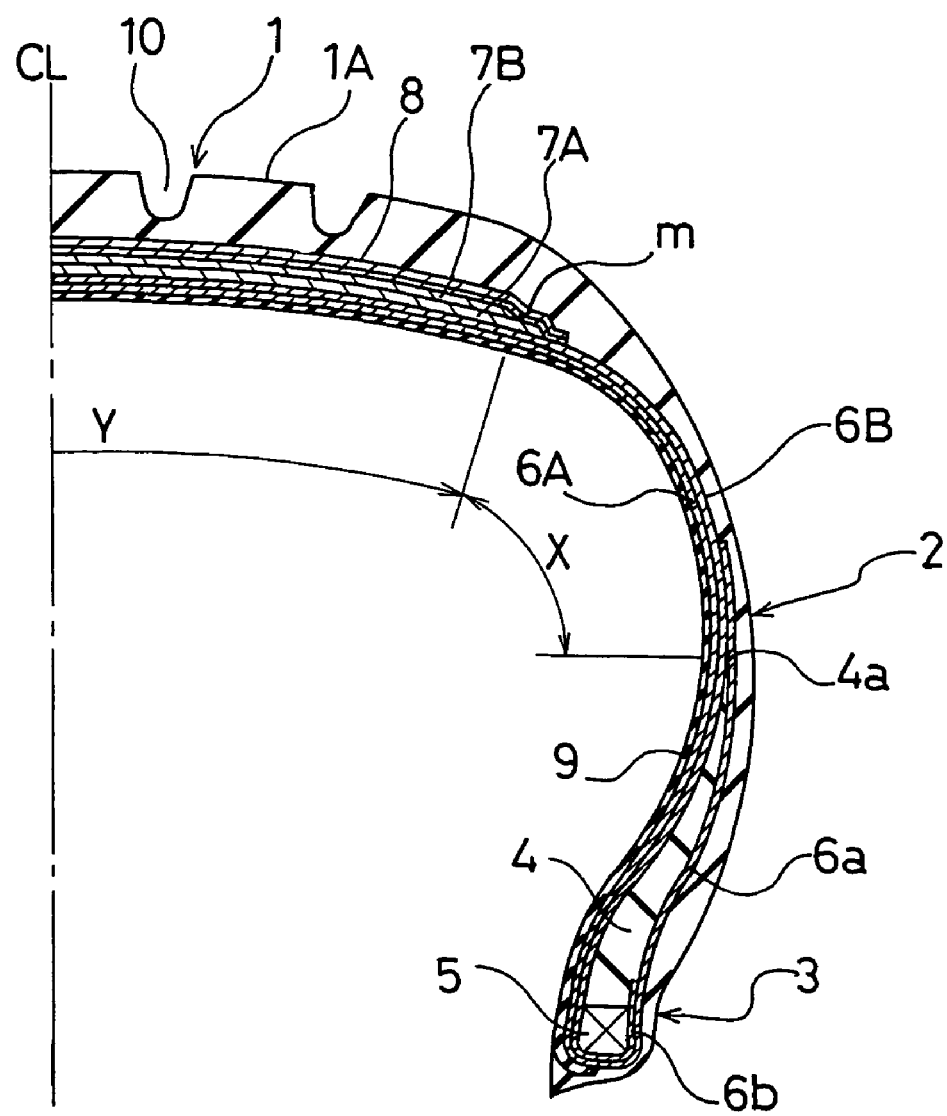
FIG. 1 is a tire meridian half cross sectional view illustrating an embodiment of a pneumatic tire for passenger cars according to the present invention.
Figure 2:
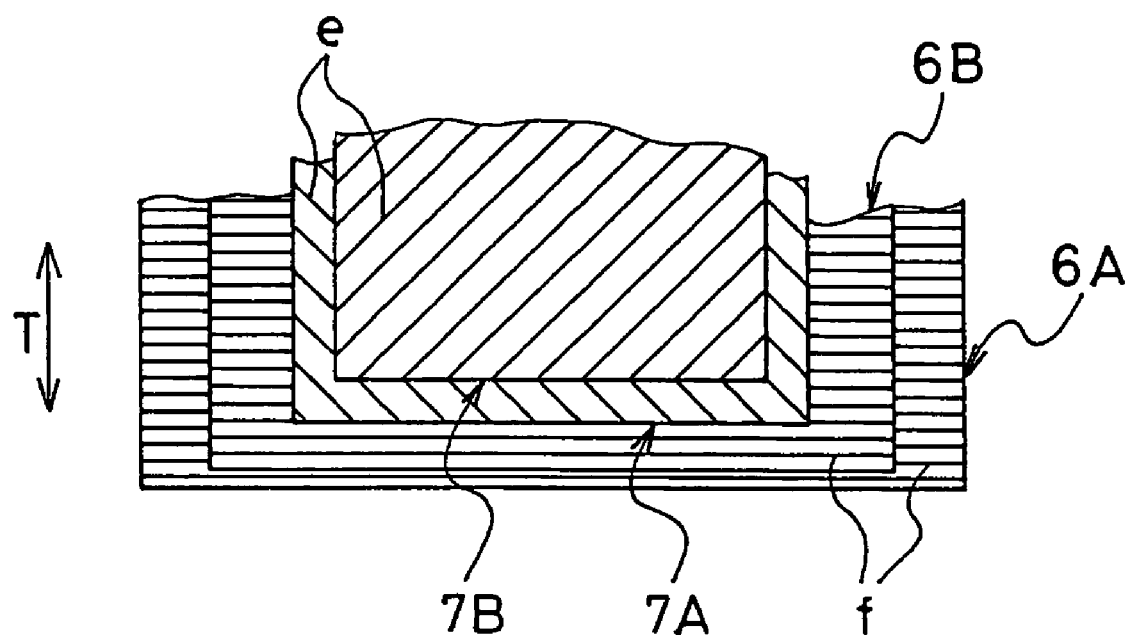
FIG. 2 is an explanatory view of carcass and belt plies shown in FIG. 1.

FIGS. 1 and 2 show an example of a pneumatic tire for passenger cars according to the present invention, in which the reference numeral 1 denotes a tread, the reference numeral 2 a sidewall, the reference numeral 3 a bead, and the reference symbol CL a tire center line.

A bead core 5 with a bead filler 4 disposed on the outer circumferential side thereof is embedded in each of the left and right beads 3. Two carcass plies 6A and 6B are arranged to extend between the beads 3, the carcass plies 6A and 6B each comprising a rubber layer and reinforcing cords f alignedt herein, the reinforcing cords being constituted of organic fiber cords (twisted cords), extending in a width direction of the tire and being arranged at a predetermined interval along a circumferential direction T of the tire. The carcass plies 6A and 6B have end portions 6a and 6b, which are turned up around the bead cores 5 from the inner side to the outer side of the tire.

Arranged on the outer circumferential side of the carcass plies 6 in the tread 1 are two belt plies 7A and 7B, each of which comprises reinforcing cords e, made of steel cords, which extend in a slanted manner relative to the tire circumferential direction T and are aligned at a predetermined interval along the tire circumferential direction T. The first belt ply 7A on the side of the carcass plies 6 is formed to be wider in width than the second belt ply 7B, in which the reinforcing cords e of the belt plies 7A and 7B are intersected to each other so that they are oriented in opposing directions with respect to the tire circumferential direction T.

Provided radially outwardly of the second belt ply 7B are two belt cover plies 8 each of which comprise an organic fiber cord spirally wound in the tire circumferential direction T. An inner liner ply 9 is disposed on the inner side of the carcass ply 6A. The reference numeral 10 denotes a main groove extending along the tire circumferential direction T on the tread surface 1A.

The two carcass plies 6A and 6B described above has an average of residual strain of the reinforcing cords f which is set in a range from −10% to 5% in each side region X located between the outer circumferential end 4a of the bead filler 4 and the overlapping portion end m of the two belt plies 7A and 7B (an edge position of the second belt ply 7B). In an overlapping region Y corresponding to the overlapping portion of the two belt plies 7A and 7B, an average of residual strain of the reinforcing cords f is set in a range from −5% to 1%.

The inventor of the present invention has intensely studied ways to improve braking performance without changing of a rubber compound of the tread, which incurs deterioration of rolling resistance and wear characteristics, and without provision of any new component. As a consequence, the inventor of the present invention focused on carcass plies arranged to extend between the left and right beads.

Carcass plies include reinforcing cords. If the tension of the reinforcing cords is increased, the rigidity of the carcass plies can be increased. Thus, it is possible to improve braking performance without changing a rubber compound of the tread or providing any new component.

A pneumatic tire is manufactured through a vulcanization process. Accordingly, residual strain is usually observed on the reinforcing cords of carcass plies after curing. A study of a relationship between residual strain and rigidity of the carcass ply revealed that the reinforcing cords with less residual strain have lower effect of untwisting. Thus, rigidity of a carcass ply can be enhanced by utilizing rigidity of the reinforcing cords. The less the residual strain is, the further the rigidity of the reinforcing cords can be utilized to increase rigidity of a carcass ply. Preferably, the value of the residual strain is a minus value. It has been found that rigidity of a carcass ply can be greatly increased especially in the overlapping region Y.

When measurements of residual strain of the reinforcing cords of the innermost carcass ply of the conventional tire were carried out, the average of residual strain was approximately 2% in the belt ply overlapping region in the tread and the average of residual strain is approximately 8% in the rest of the region. Accordingly, if the average values of residual strain of the reinforcing cords can be less than the values, it becomes possible to improve braking performance without using a high-grip rubber compound in the tread or disposing any new component.

Thus, as described above, the averages of residual strain of the reinforcing cords f are set in a range from −10% to 5% in the side region X and −5% to 1% in the overlapping region Y. The average of residual strain of the reinforcing cords f in the bead 3 side region positioned radially inwardly of the side region X may be set in the same range from −10% to 5% as in the side region X. However, the bead filler 4, made of rubber with higher rigidity than the rubber constituting the sidewall 2, is usually disposed in the region, thus providing high rigidity to the region. Therefore, even if the rigidity of the carcass plies 6A and 6B is increased in the region, this increase will not play a part in improvement of braking performance.

If the average of residual strain of the reinforcing cords f is less than the foregoing range in either or both of the regions X and Y, uniformity will greatly decrease. In order to obtain an effect of highly improved braking performance, it is preferable that the averages of residual strain be set in the above ranges in both regions X and Y. However, setting of an average of the residual strain to the above range in either of the regions can improve braking performance.

The pneumatic tire described above can be produced as follows: a green tire is shaped to have an size close to that of the green tire pressed against the molding surfaces of a vulcanization mold to form a shaped green tire; the shaped green tire is set in the vulcanization mold before inflated; the shaped green tire is vulcanized by heating; and the vulcanized pneumatic tire is cooled down in a post cure inflation process in which, as required, air pressure which is supplied is adjusted.

Figure 3:
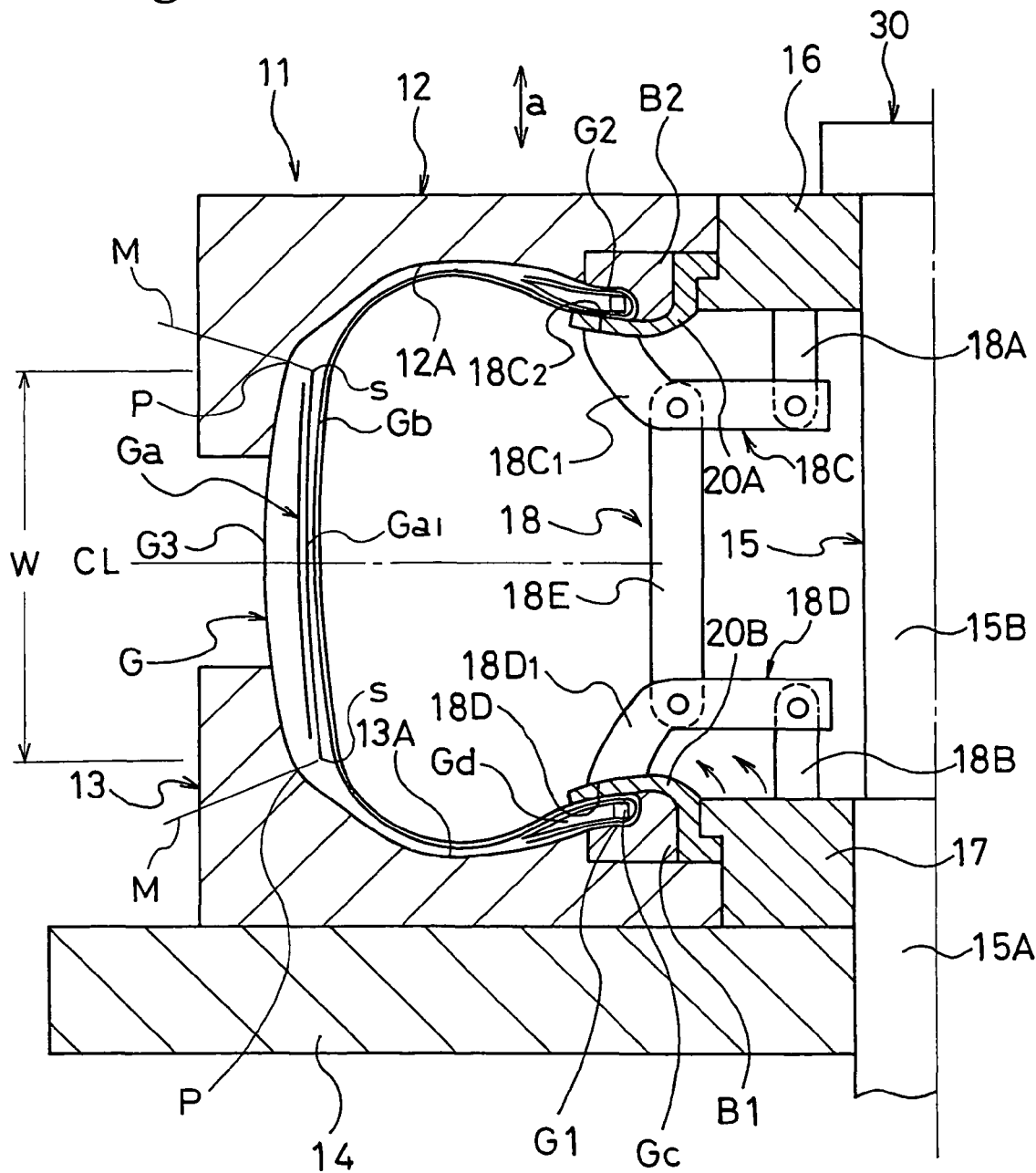
FIG. 3 is an explanatory half cross sectional view illustrating an example of a shaping device used for manufacturing a pneumatic tire for passenger cars according to the present invention.

To form the shaped green tire, a shaping device, for example, shown in FIG. 3 having a shaping mold can be used. A green tire G shown in FIG. 3 comprises left and right beads G1 and G2 and a tread G3, the beads G1 and G2 each having a bead core Gc embedded therein with an unvulcanized bead filler Gd disposed on the outer circumferential side of the bead core, an unvulcanized carcass ply Gb being arranged to extend between the beads G1 and G2, the carcass ply Gb having reinforcing cords which extend in a width direction of the tire and are aligned at a predetermined interval along a circumferential direction of the tire, and two unvulcanized belt plies Ga being disposed on the outer circumferential side of the unvulcanized carcass ply Gb in the tread G3.

The reference numeral 11 denotes a shaping mold for shaping the green tire G. The shaping mold 11 comprises upper and lower circular mold sections 12 and 13 disposed on the upper and lower sides of the shaping mold 11.

The lower mold section 13 is fixed onto a base plate 14. A lower mold bead ring B1 is fastened to the inner surface of the inner circumferential side of the lower mold section 13 to shape one bead G1 of the green tire G. The upper mold section 12 can ascend and descend in directions indicated by an arrow a by ascending and descending means (not shown). An upper mold bead ring B2 is fixed onto the inner surface of the inner circumferential side of the upper mold section 12 to shape the other bead G2 of the green tire G.

Shaping surfaces 12A and 13A of the upper and lower mold sections 12 and 13 extend from the beads G1 and G2 of the green tire G to the tread G3. As shown in FIG. 3, the upper and lower mold sections 12 and 13 are not abutted on each other and separated apart when the green tire G is set, so as to open the central side of the tread G3. This can easily release strain of the reinforcing cords of the unvulcanized belt plies Ga and the unvulcanized carcass ply Gb which is generated when pressing the green tire G against the shaping surfaces 12A and 13A by inflation of the green tire G. Therefore, this structure is preferable in terms of improving uniformity. However, it may be constructed such that the upper and lower mold sections 12 and 13 are abutted on each other when the green tire G is set.

As described above, in the case where the upper and lower mold sections 12 and 13 are structured so as to be spaced apart from each other, it is preferable to have the shaping surfaces 12A and 13A each of which extends from the bead G1, G2 of the green tire G to at least a intersection P where a vertical line M intersects with the tread surface G3a. The vertical line M is perpendicularly drawn to the tread surface G3a from the end s of the widest belt ply $Ga_1$ having the largest width.

Preferably, the shaping surfaces 12A and 13A extend tire-inward (towards the tire center line CL) along the tire width direction to positions which are located at 20% or more of the width W of the widest belt ply $Ga_1$ from the ends s of the widest belt ply $Ga_1$. This structure is preferable for effectively preventing the tread G3 from expanding out of a space between the upper and lower mold sections 12 and 13 during inflation of the green tire G.

Holding means 30 for holding the beads G1 and G2 of the green tire G is provided in the center side of the shaping mold 11. The holding means 30 includes lifting means 15 at the center of the shaping mold 11. The lifting means 15 comprises a hydraulic cylinder actuated with pressurized oil. The hydraulic cylinder has a upstanding cylinder body 15A and a vertically extending rod 15B which protrudes upwardly from the upper end of the cylinder body 15A and is vertically moved.

A circular upper member 16 is hermetically engaged with and fastened to the upper end of the rod 15B. The upper member 16 is enabled to move up and down with raising and lowering of the rod 15. A circular lower member 17 is fixed to the base plate 14 and hermetically engaged with the cylinder body 15A. The lower plate 17 is disposed on the inner circumferential side of the lower mold section 13.

Cylindrically formed rubber sealing member 20A and 20B are provided such that one end portion of the sealing member 20A and one end portion of the sealing member 20B are securely attached between the upper mold bead ring B2 and the upper member 16 and between the lower mold bead ring B1 and the lower member 17, respectively. The sealing members 20A and 20B each have the other end portion which expands outwardly so that the diameter of the other end is larger.

Holding mechanisms 18 for holding the beads G1 and G2 are provided at a plurality of locations at a predetermined interval along a circumferential direction of the circular mold between the upper member 16 and the lower member 17. Each of the holding mechanisms 18 comprises an upper support arm 18A protruding downward from the upper member 16, a lower support arm 18B protruding upward from the lower member 17, and holding arms 18C and 18D for holding the beads G1 and G2. The holding arms 18C and 18D are connected to the upper support arm 18A and the lower support arm 18B, respectively.

The holding arms 18C and 18D have bend end portions 18C1 and 18D1, end surfaces 18C2 and 18D2 of which hold the inner surfaces of the beads G1 and G2 of the green tire G, set to the upper and lower bead rings B1 and B2, by pressing the inner surfaces of the beads G1 and G2 via the sealing members 20A and 20B.

A connecting arm 18E connects the holding arms 18C and 18D at their middle parts. The upper and lower support arms 18A and 18B, the upper and lower holding arms 18C and 18D and the connecting arm 18E constitute a link mechanism. When the rod 15B is raised, holding by the holding mechanisms 18 is released, and the holing mechanisms 18 hold beads G1 and G2 in a lowered position shown in FIG. 3.

Formed in the base plate 14 and the lower plate 17 are a supply path (not shown) which supplies a pressure medium into the green tire G set in the shaping mold 11 and a discharge path (not shown) which discharges the pressure medium therefrom. The green tire G is inflated by the pressure medium supplied from a pressure medium supply source (not shown) through the supply path while the pressure medium is constantly supplied from the supply path. Meanwhile, a constant pressure is maintained in the green tire G while the pressure medium is discharged from the discharge path. Thus, the inflated green tire G is cooled down by the pressure medium.

As described above, it is preferable to directly inflate the green tire G with a pressure medium in order to uniformly press the green tire G against the shaping surfaces 12A and 13A of the upper and lower mold sections 12 and 13. However, instead of the sealing members 20A and 20B, a cylindrical bladder can be attached and the green tire G may be inflated by supplying a pressure medium into the bladder and by expanding the bladder.

In order to set the averages of residual strain of the reinforcing cords f in the aforementioned ranges, the dimensions of the shaping surfaces 12A and 13A are adjusted. To reduce the averages of residual strain of the reinforcing cords f, the dimensions of the shaping surfaces 12A and 13A are set to the dimensions of the molding surfaces of the vulcanization mold as closely as possible. To reduce only the average of residual strain of the reinforcing cords in the side regions X, the dimensions of parts of the shaping surfaces 12A and 13A corresponding to the side regions X are set to the dimensions of the molding surfaces of the vulcanization mold as closely as possible. To reduce only the average of residual strain of the reinforcing cords in the overlapping region Y, the dimensions of parts of the shaping surfaces 12A and 13A corresponding to the overlapping region Y are set to the dimensions of the molding surfaces of the vulcanization mold as closely as possible.

It is preferable that treatment of the shaping surfaces 12A and 13A of the upper and lower mold sections 12 and 13 be carried out to reduce friction against the green tire G. For example, a silicon-based solution can be applied to the shaping surfaces 12A and 12B before setting the green tire G.

The green tire G will be shape dusing the aforementioned shaping device as follows. First, the green tire G is preheated. The preheating temperature is preferably set so that the surface temperature of the green tire G is in a range from 40° C. to 90° C. when set in the shaping mold 11. If the temperature is lower than 40° C., it is difficult to give unvulcanized rubber a creep strain. As a result, it is hard to give the green tire G some predetermined deformation. If the temperature exceeds 90° C., the rigidity of the green tire G rapidly decreases. Accordingly, there is a possibility that the green tire G bursts during inflation.

The green tire G is set to the lower mold section 13 after preheated. At this time, the upper mold section 12 stays in a waiting position above. The rod 15B is in the elevated position, and holding by the holding mechanisms 18 are released.

After the green tire G is set in the lower mold section 13, the rod 15B descends, and holding mechanisms 18 hold the beads G1 and G2 through the sealing members 20A and 20B, as shown in FIG. 3. Subsequently, the upper mold section 12 in the waiting position descends to be set to the green tire G (the state of the upper mold section in FIG. 3)

After completion of the setting of the green tire G in the shaping mold 11, a pressure medium is supplied to the inside as indicated by arrows, and the green tire G is inflated. Owing to this, the green tire G is pressed against the shaping surfaces 12A and 13A of the upper and lower mold sections 12 and 13 to be shaped (the state in FIG. 3). For the pressure medium, a medium which can cool down the preheated green tire G1 is employed. For example, air at a room temperature and preferably cooled down air at a temperature lower than the room temperature can be used.

The green tire G is cooled down for a predetermined time period by supplying the pressure medium while maintained in a state in which the green tire G is being pressed against the shaping surfaces 12A and 13A. The cooling temperature of the green tire G may be such that a surface temperature of the tire is 30° C. or lower when removed from the shaping mold 11. If the tire surface temperature is higher than 30° C., the elasticity of the unvulcanized rubber recovers. Thus, there is a possibility that the shape of the green tire G regains the shape before shaping.

After cooling, the upper mold section 12 ascends to the waiting position above. Subsequently, the rod 15B is elevated to release the holding by the holding mechanisms 18, and the green tire G is removed. The green tire G obtained is formed into a shaped green tire which is close in size to the green tire in the state of being pressed against the molding surfaces of the vulcanized mold. The shaped green tire is, as in a conventional method, pressed and heated inside the mold of a vulcanization machine to cure the shaped green tire.

According to the present invention described above, by setting the averages of residual strain of the reinforcing cords f of the carcass plies 6A and 6B lower than conventional ones, it is possible to increase rigidity of the carcass plies 6A and 6B. As a consequence, braking performance can be improved. Since it is not required to use a high-grip rubber compound in the tread 1, rolling resistance and wear characteristics can not be deteriorated. It is not required to provide any new component, thereby preventing increases in cost and weight.

In addition, by setting the average of residual strain of the reinforcing cords f of the carcass plies 6A and 6B in the side regions X as previously mentioned, a side rigidity of the tire can be enhanced. Accordingly, it is possible to increase steering stability.

In the present invention, the average of residual strain of the reinforcing cords f of the carcass plies 6A and 6B in the side regions X is preferably set to −10% to 3% in order to further improve braking performance, and desirably −10% to 0%.

The average of residual strain of the reinforcing cords f of the carcass plies 6A and 6B in the overlapping region Y is preferably set to −5% to −1% in order to further improve braking performance, and desirably −5% to −3%.

In the foregoing embodiment, the averages of residual strain of the reinforcing cords f of the carcass plies 6A and 6B are set in the ranges described above. However, at least the averages of residual strain of the reinforcing cords f of the innermost carcass ply 6A may be set in the above-mentioned ranges.

It is preferable to specify the averages of residual strain of the reinforcing cords f of the carcass plies, as described above, in the side regions X and the overlapping region Y in order to further improve braking performance. However, braking performance can be improved by specifying, as described above, of the average of residual strain of the reinforcing cords f in either of the side regions X or the overlapping region Y.

In FIG. 1, an embodiment of a pneumatic tire for passenger cars having two carcass plies is described, but the present invention is applicable to ones which have at least one carcass ply.

According to the present invention, the average of residual strain of the reinforcing cords f will be measured as follows.

First, an inner liner ply 9 is removed from the pneumatic tire to expose the inner carcass ply 6A. Second, a plurality of reinforcing cords f (2 to 5 cords) of the carcass ply 6A, which are arbitrary targets for measuring, are marked at positions corresponding to the tire center line CL, the opposed ends m of the overlapping portion and the outer circumferential ends 4a of the bead fillers 4. Third, a non-expandable tape is stuck along the marked reinforcing cords f, and the markings are made to transfer to the non-expandable tape. Thereafter, the plurality of marked reinforcing cords f are extracted from the tire. Each residual strain value is calculated based on a distance between the markings of the extracted reinforcing cords f and a distance between the corresponding markings transferred onto the non-expandable tape.

More specifically, values (%) of residual strain of the reinforcing cords f in the side regions X and in the overlapping region Y are calculated by equations 100 (M−M')/M' and 100 (N−N')/N', respectively, where M is a distance between the marking positions of the extracted reinforcing cords f corresponding to the tire center line CL and the overlapping portion end m, N is a distance between the marking positions of the extracted reinforcing cords f corresponding to the overlapping portion end m and the outer circumferential end 4a of the bead filler 4, M' is a distance between the marking positions, corresponding to the tire center line CL and the overlapping portion end m, of the non-expandable tape to which the markings have been transferred, and N' is a distance between the marking positions, corresponding to the overlapping portion end m and the outer circumferential end 4a of the bead filler 4, of the non-expandable tape to which the markings have been transferred.

The foregoing measurement is performed at six spots at an approximate regular interval along the entire circumference of the tire. The values of residual strain obtained in each region are averaged to be specified as an average of residual strain.

EXAMPLE 1

Test tires according to the present invention tires 1 to 5, comparative tire 1 and conventional tire were produced having the same tire size of 225/55R16 and a construction of a pneumatic tire shown in FIG. 1, in which the reinforcing cords of the carcass plies were polyester cords. The test tires each had averages of residual strain of the carcass plies shown in Table 1, in which the averages of residual strain of the reinforcing cords in the overlapping region were constant and the averages of residual strain of the reinforcing cords of the carcass plies in each of side regions were varied.

Each test tire was attached to a rim with a rim size of 16×7.5 JJ, and air pressure was set to 200 kPa. The evaluation tests of braking performance and uniformity were conducted in the following testing method, obtaining the results shown in Table 1.

[Braking Performance]

Each test tire was fit to a passenger car of 3000 cc displacement with an anti-lock braking system. When running the test course with a wet surface at 100 km/h, braking was applied to stop the car, and the braking distance up to stopping was measured seven times. The mean value of five braking distances except maximum and minimum braking distances was calculated, and each result of the present invention tires and comparative tire was evaluated in the index, on the basis of the conventional tire as 100. The greater the index is, the shorter the braking distance is. Accordingly, braking performance is better with the larger index. The index value of 105 or more indicates that there is an effective improvement.

[Uniformity]

Radial force variations (RFV) of each lot of ten test tires were measured with a load of 5.0 kN based on JASO 0607-87. The average of the measurements of ten test tires of each lot was taken as RFV thereof. The results were evaluated by the index value, where the conventional tire had the index value of 100. The smaller the value is, the better the uniformity is. The index value of 104 or less indicates that the uniformity is within the scope of the conventional level.

TABLE 1

| | OVER-LAPPING REGION(%) | SIDE REGION (%) | BRAKING PERFORMANCE | UNIFORMITY |
|---|---|---|---|---|
| CONVENTIONAL TIRE | 2 | 8 | 100 | 100 |
| PRESENT INVENTION TIRE 1 | 2 | 5 | 105 | 100 |
| PRESENT INVENTION TIRE 2 | 2 | 3 | 108 | 100 |
| PRESENT INVENTION TIRE 3 | 2 | 0 | 116 | 101 |
| PRESENT INVENTION TIRE 4 | 2 | −5 | 119 | 103 |
| PRESENT INVENTION TIRE 5 | 2 | −10 | 120 | 104 |
| COMPARATIVE TIRE | 2 | −15 | 121 | 112 |

As can be seen from Table 1, it is understood that the present invention tires which have averages of residual strain of the reinforcing cords of the carcass plies in the side regions, set in a range from −10% to 5%, can improve braking performance while maintaining uniformity at a conventional level.

EXAMPLE 2

Test tires according to the present invention tires 6 to 10 and comparative tire 2 were produced having the same tire size as in Example 1 and a construction of a pneumatic tire shown in FIG. 1, in which the reinforcing cords of the carcass plies were polyester cords. The test tires each had averages of residual strain of the carcass plies shown in Table 2, in which, according to the present invention tires 6 to 9 and comparative tire 2, the averages of residual strain of the reinforcing cords in the side regions were constant and the averages of residual strain of the reinforcing cords of the carcass plies in the overlapping region were varied, and according to the present invention tire 10, the averages of residual strain of the reinforcing cords in the side regions and in the overlapping region were within the ranges of the present invention.

As in Example 1, the evaluation tests of braking performance and uniformity were carried out, obtaining the results shown in Table 2.

TABLE 2

| | OVER-LAPPING REGION(%) | SIDE REGION (%) | BRAKING PERFORMANCE | UNIFORMITY |
|---|---|---|---|---|
| PRESENT INVENTION TIRE 6 | 1 | 8 | 108 | 101 |
| PRESENT INVENTION TIRE 7 | −1 | 8 | 122 | 101 |
| PRESENT INVENTION TIRE 8 | −3 | 8 | 127 | 102 |
| PRESENT INVENTION TIRE 9 | −5 | 8 | 130 | 104 |
| COMPARATIVE TIRE 2 | −7 | 8 | 131 | 115 |
| PRESENT INVENTION TIRE 10 | −3 | 0 | 131 | 102 |

As can be seen from Table 2, it is understood that the present invention tires which have averages of residual strain of the reinforcing cords of the carcass plies in the overlapping region, set in a range from −5% to 1%, can improve braking performance while maintaining uniformity at a conventional level.

As explained above, according to the present invention, by specifying, as mentioned above, the average of residual strain of the reinforcing cords of the carcass ply in the side regions or in the overlapping region, braking performance can be improved without using a high-grip rubber compound in the tread and without disposing any new component.

What is claimed is:

1. A method of manufacturing a pneumatic tire for passenger cars, comprising the steps of:
setting a green tire in a shaping mold after said green tire is preheated, for pre-shaping green tires, the green tire having components including a tread and left and right beads, the beads each having a bead core embedded therein with an unvulcanized bead filler disposed on the outer circumferential side of the bead core, at least one unvulcanized carcass ply being arranged to extend between the beads, the carcass ply having reinforcing cords which extend in a width direction of the tire and are aligned at a predetermined interval along a circumferential direction of the tire, and two unvulcanized belt plies being disposed on the outer circumferential side of the unvulcanized carcass ply in the tread, the shaping mold having shaping surfaces which can shape a green tire having a size close to that of the green tire which is being pressed against molding surfaces of a vulcanization mold;
inflating the set green tire so that the set green tire is pressed against the shaping surfaces of the shaping mold such that the shaping surfaces are in contact with a surface of the green tire to form a shaped green tire; and
setting the shaped green tire in the vulcanization mold, wherein the shaped green tire includes at least one unvulcanized tire component; and
curing the shaped green tire after inflating the shaped green tire so as to press against the molding surfaces of the vulcanization mold,
wherein the shaping mold has the shaping surfaces extending from the beads of the set green tire to at least intersections where vertical lines perpendicularly drawn to a tread surface of the tread from ends of a widest belt ply of the unvulcanized belt plies meet the tread surface.

2. A method of manufacturing a pneumatic tire for passenger cars according to claim 1, wherein the green tire is preheated so that a surface temperature of the green tire is 40° C. to 90° C. when set in the shaping mold.

3. A method of manufacturing a pneumatic tire for passenger cars according to claim 1, wherein the green tire is cooled down after being inflated in the shaping mold.

4. A method of manufacturing a pneumatic tire for passenger cars according to claim 3, wherein the shaped green tire is cooled down so that the surface temperature of the shaped green tire is 30° C. or lower when removed from the shaping mold.

5. A method of manufacturing a pneumatic tire for passenger cars according to claim 1, wherein each of the shaping surfaces extends tire-inward along the tire width direction to a position which is located at 20% or more of the width of the widest belt ply from the end of the widest belt ply.

* * * * *